United States Patent

[11] 3,615,988

[72] Inventors Kenneth D. Richmond
Nixa;
James R. Thomas, Springfield, both of Mo.
[21] Appl. No. 802,059
[22] Filed Feb. 25, 1969
[45] Patented Oct. 26, 1971
[73] Assignee Dayco Corporation
Dayton, Ohio

[54] METHOD FOR MANUFACTURING TRANSMISSION BELTS
4 Claims, 5 Drawing Figs.
[52] U.S. Cl.................................................. 156/141,
156/142, 156/189, 156/190, 156/193, 156/194
[51] Int. Cl...................................................... B29h 7/22
[50] Field of Search.......................................... 156/139,
189, 190, 193, 140, 141, 194

[56] References Cited
UNITED STATES PATENTS
2,292,290  8/1942  Robins ......................... 156/140 X
2,538,414  1/1951  Crosby ......................... 156/141

Primary Examiner—Carl D. Quarforth
Assistant Examiner—Stephen J. Lechert, Jr.
Attorney—Reuben Wolk ABSTRACT: A V-belt having an arched outer surface and arched neutral axis strength cords, and the method of manufacturing the same in sleeve form. The belt sleeve is built in an inverted manner on a drum having arched grooves on the surface and cut after curing along cut lines spaced in accordance with the groove spacing.

PATENTED OCT 26 1971 3,615,988
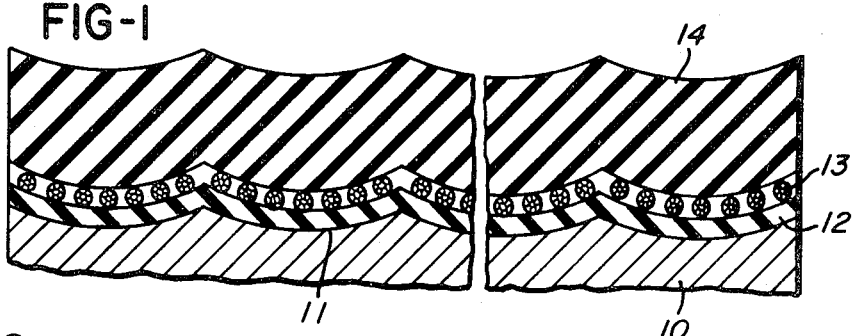
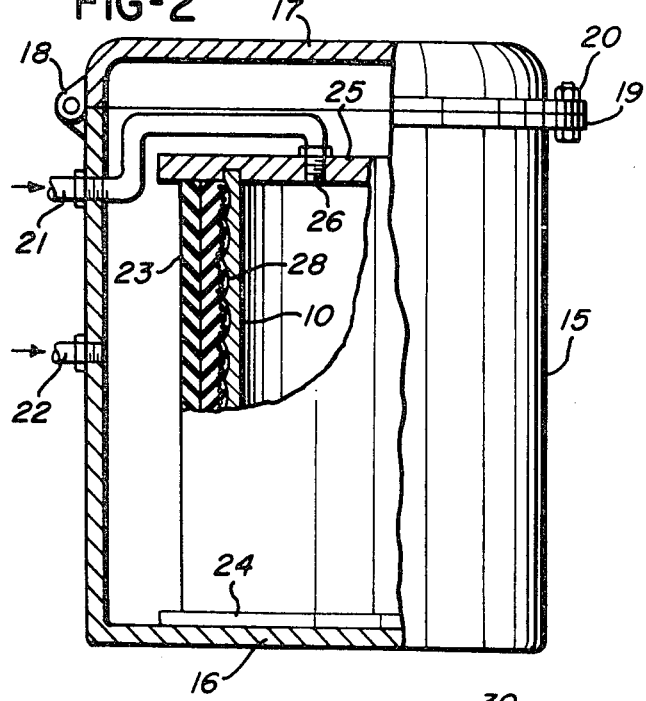
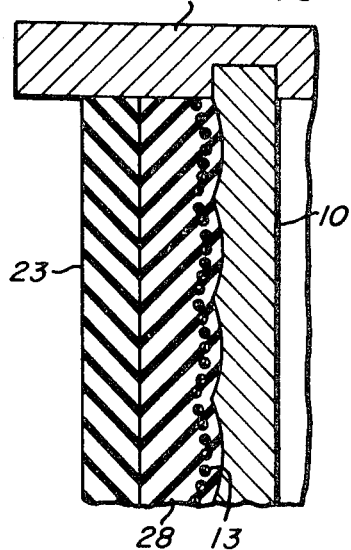
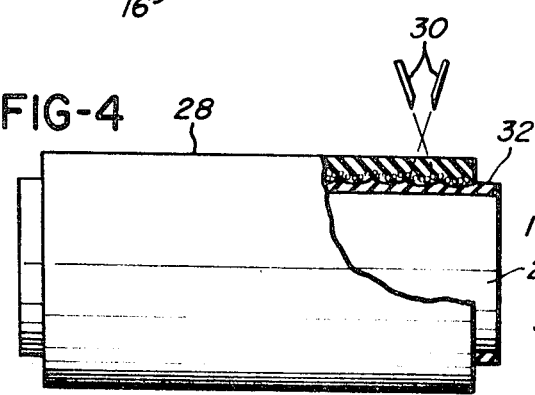
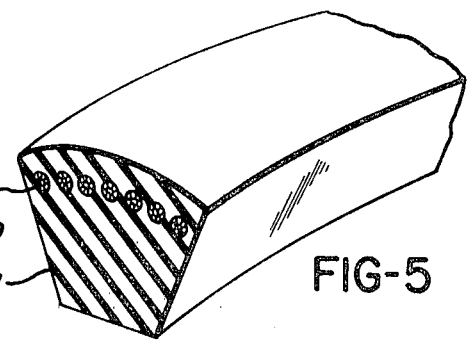
INVENTORS
KENNETH D. RICHMOND
JAMES R. THOMAS
BY Reuben Wolk

METHOD FOR MANUFACTURING TRANSMISSION BELTS

Conventional transmission belts of V-type have an outer section placed in tension as the belt passes around a pulley and an inner section placed in compression, and between these sections there is normally a neutral axis section comprising a cord which is continuously wound in a helical manner. One method of making such belts has consisted of applying a layer of elastomeric material to a cylindrical drum, applying the reinforcing cord and then the outer layer of elastomeric material. The cylindrical mass thus formed is cured and cut into individual belt bodies. This provides a series of belts having cut or raw driving edges or sides in which the inner and outer transverse surfaces and the cord layer are all parallel, as viewed in an transverse section.

With the advent of new materials employed in power transmission belts, the strength of these belts has been considerably increased. This increased strength, however, may be made available for increased power transmission only if the belt may be firmly held relative to the pulleys. In the case of V-belts, so called because of their trapezoidal cross section, the belt is held against slipping in the pulley by the wedging action of the trapezoidal belt in the V-shaped groove of the pulley. It is apparent that the deeper the belt is wedged in the pulley groove the more firmly it will be held. It is also apparent that as this wedging action takes place, lateral stresses are applied to the side-driving faces of the belt and will tend to result in its lateral deformation. Such deformation on the other hand, will result in a loss of the wedging effect and the attendant loss of the firm hold of the pulley on the belt. The problem then is to increase the resistance of the belt to lateral deformation. This problem is particularly prominent in the case of variable speed belt drives incorporating pulleys of variable pitch diameters obtainable by varying the spacing between the opposed faces of the pulley groove where stresses tending to cause lateral deformation take place as the opposed faces of the pulley groove are forced together usually under the action of a spring. Thus it will be seen that the present invention finds special utility in V-belt drives involving excessive loads or power transmission requirements, as well as in variable speed drives.

To achieve the desired lateral stability, various expedients have been employed in the prior art. Among these have been the formation of the belt in the shape of an arch in order that its mass will be most advantageously located for resisting any lateral deformation. Such a construction is shown in U.S. Pat. No. 2,417,512, but the full potential inherent in the arched design was not realized by even the inventor of this earlier patent. The earlier designs have not lived up to expectations because of collapse or buckling of the belt about its longitudinal axis, stress concentrations at the points of such buckling, and the inability of such belts to maintain a fixed position in the pulley groove in the case of variable speed drives where rigid control of the operating pitch diameters is required.

The invention provides a raw edge V-belt having an outer surface that is arched in the transverse direction, and has a neutral axis cord layer that is also arched and parallel to the outer surface. For the first time it is possible to build such a belt with raw (unwrapped) edges in sleeve form and to cut the individual belts after curing. This is done by building up the belt sleeve in inverted manner on a drum which has the arched contours built into it. The sleeve is cured and removed, and the individual belts are cut with the sleeve inverted. The resultant belt is highly resistant to rollover and flip-off.

The invention is further described in the following specification and drawings, in which:

FIG. 1 is a sectional view of a belt sleeve assembled on a building drum.

FIG. 2 is an elevational view in partial section illustrating the method of curing the belt.

FIG. 3 is an enlarged sectional view further illustrating the relationship of the belt sleeve and the curing apparatus.

FIG. 4 is an elevational view in partial section illustrating the process of cutting the belts after curing.

FIG. 5 is a perspective view in partial section illustrating the finished belt.

Referring to the drawings, the belt is built up in the form of a sleeve in a more or less conventional manner by assembling layers of material on a building drum 10. The drum, however, is somewhat unusual in that the outer surface thereof instead of being cylindrical is formed with a series of concave arched grooves 11 with the grooves extending completely around the periphery of the drum. A belt layer 12, which is the tension section, is wrapped around the outer surface of the drum. Upon this layer is spun a layer of cord 13 which may be made of nylon, polyester, rayon, cotton, glass fibers, or other conventional cord material. The cord will achieve the same general arched configuration which is created by the grooves 11 and followed by the layer 12, the spacing of the cords being maintained by a slight pressure of these cords into the layer 12. An outer layer of rubber 14, which becomes the compression section of the belt, is then applied around the cord. The layers 12 and 14 may be of any natural or synthetic rubber well known in the belt building art. The exact method of applying the layers and the cord is also well known in the art as, for example, described in U.S. Pat. No. 3,188,254.

The drum 10 and the completed assembly described above are then placed within a belt-curing apparatus, which is typically illustrated in FIG. 2. Reference numeral 15 designates a cylindrical heating chamber well known in the belt-vulcanizing art, in which the drum and sleeve assembly are to be placed. The chamber has a bottom 16 and a cover 17 which close off the chamber. The cover is pivoted at hinge 18 for opening and closing and may be locked to a flange 19 by means of a bolt 20. Steam may be brought into the chamber by two separate inlets 21 and 22 so that steam is applied at different pressures to the interior and exterior of the drum which is shown in position. An outer cylindrical rubber member 23 is placed around the outside of the assembled belt-building materials and the steam is brought to the exterior of the mold and to the interior of the mold through inlet 26, thus creating a differential pressure against the outer surface of the member 23. This provides sufficient pressure to force the arched shape of the member 14 into a flat shape as shown in FIG. 2. Upon completion of the proper curing cycle the completed sleeve designated as 28 will still maintain the arched inner configuration but will have a cylindrical outer surface as better shown in FIG. 3.

The drum 10, together with the sleeve 28, is then removed from the curing apparatus. The sleeve is removed from the drum 10, which is built so that it can collapse as described in U.S. Pat. No. 2,661,579 which also illustrates a typical cutting mechanism used for cutting the belts from the sleeve. The sleeve is placed on a cutting drum 29, which has a thick resilient rubber cover 32. The individual belt bodies are cut by means of cutter 30 moving along the broken lines illustrated. The bodies are cut from the sleeve in the inverted position shown, the ends of each arch forming the ends of the belt. This is accomplished by indexing and may be done by a mechanism such as described in the above-referenced patent. The cut belt bodies are removed from the cutting drum and inverted to form the individual belts designated by reference numeral 31 as shown in FIG. 5.

In accordance with the above invention it is possible for the first time to manufacture an arched belt from a sleeve, with the desirable results described above. Although the belt is shown throughout as having a plain inner surface, it should be noted that this may be of the cog type as well by making changes in the mold during vulcanization. It should also be noted that, if desired, the finished raw edge belt may be wrapped if the use of a wrapping or cover is required for specific uses. Other modifications may be made within the scope of the invention.

We claim:

1. A method of manufacturing arched V-belts comprising the steps of forming an annular belt sleeve comprised of concentric layers of uncured rubber and cord around a building drum having concave arched grooves around the periphery thereof to create similarly arched grooves in the inner and outer surfaces of said sleeve, curing said sleeve to maintain the grooves in the inner surface thereof and cutting individual belts from said sleeve.

2. The method of claim 1 in which said sleeve is formed by wrapping a first layer of rubber around said drum, placing a continuous strength cord around said first layer, and wrapping a second layer of rubber around said cord.

3. The method of claim 1 in which said curing step forces the outer surface of said sleeve into a cylindrical configuration.

4. The method of claim 1 in which said cutting step occurs in planes which intersect the ends of the arched grooves.

* * * * *